July 31, 1928.

A. S. FISHEL 1,678,696

BRAKE SUPPORTING AND OPERATING MECHANISM

Filed Dec. 5, 1923 4 Sheets-Sheet 1

INVENTOR
Alvin S. Fishel,
BY Hull, Brock & West,
ATTYS.

July 31, 1928.
A. S. FISHEL
1,678,696
BRAKE SUPPORTING AND OPERATING MECHANISM
Filed Dec. 5, 1923
4 Sheets-Sheet 2
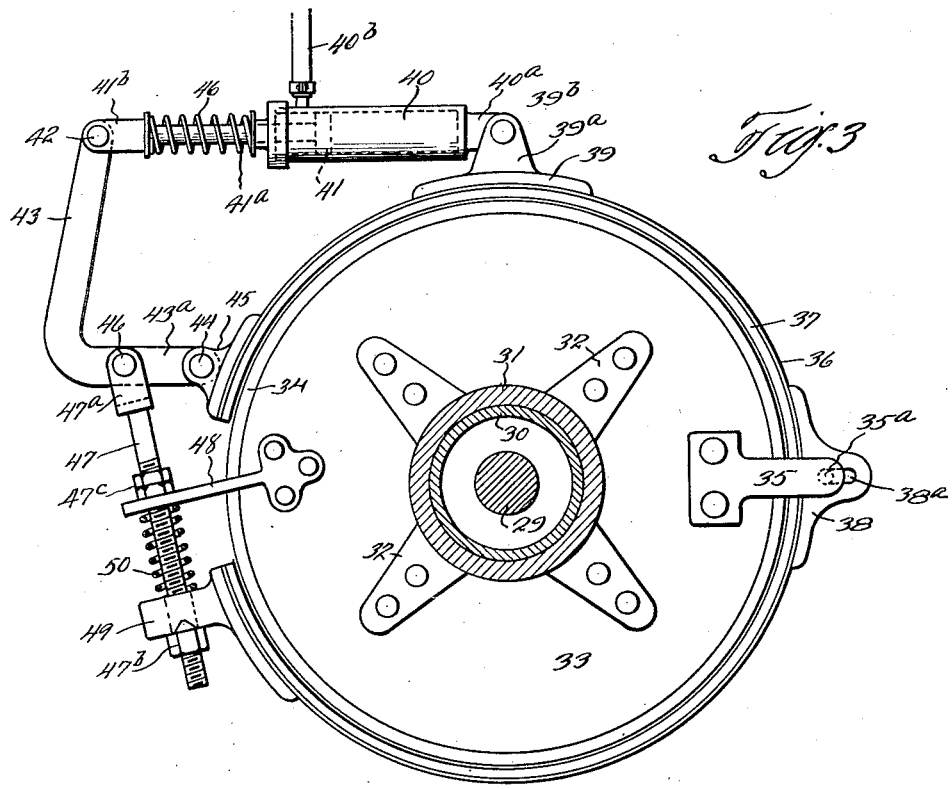
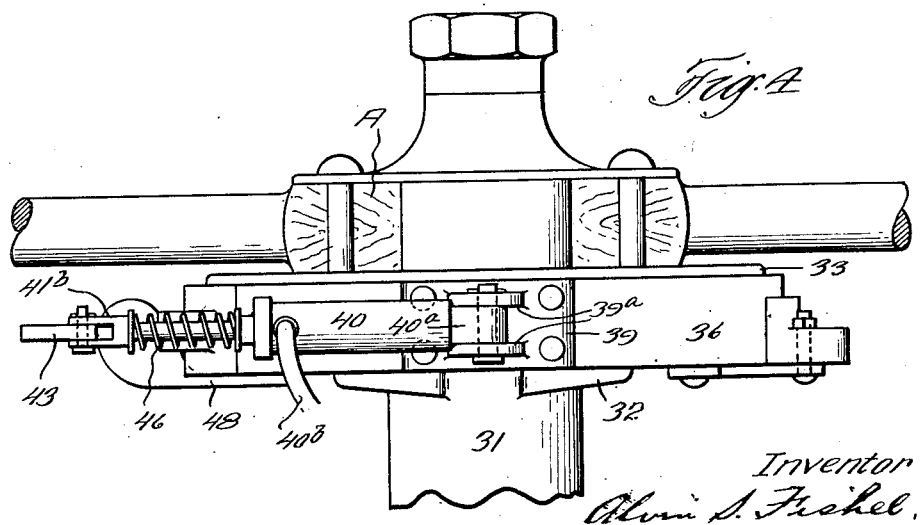
Inventor
Alvin S. Fishel,
By Hall, Brock & West.
Attys.

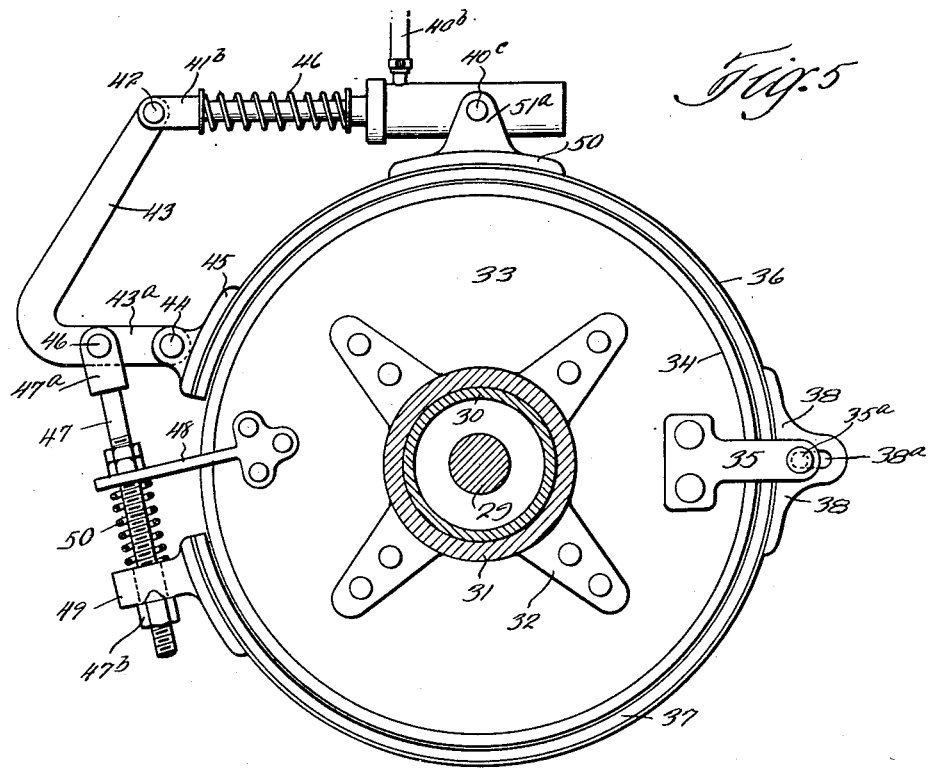
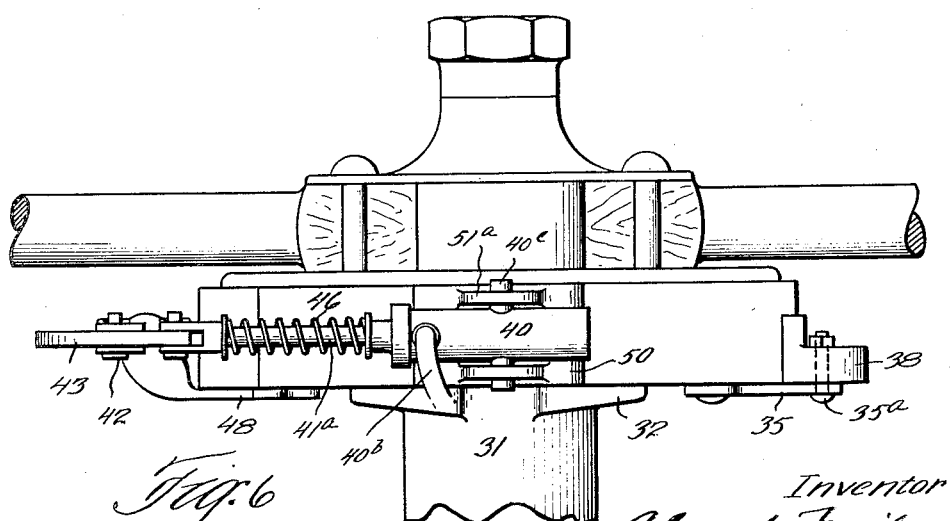

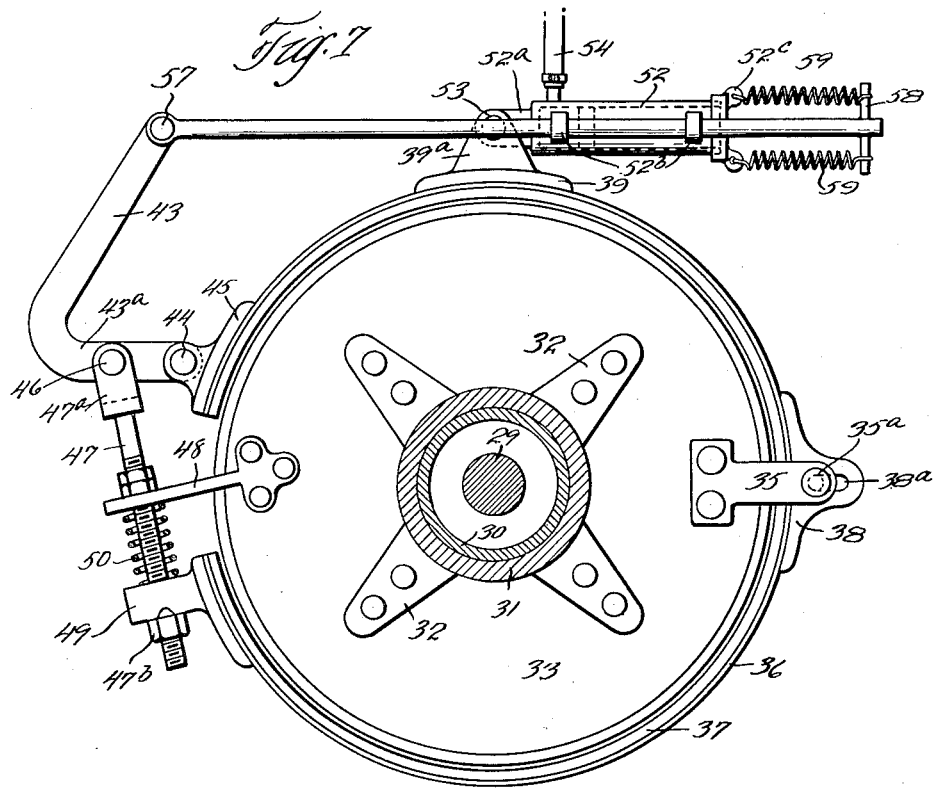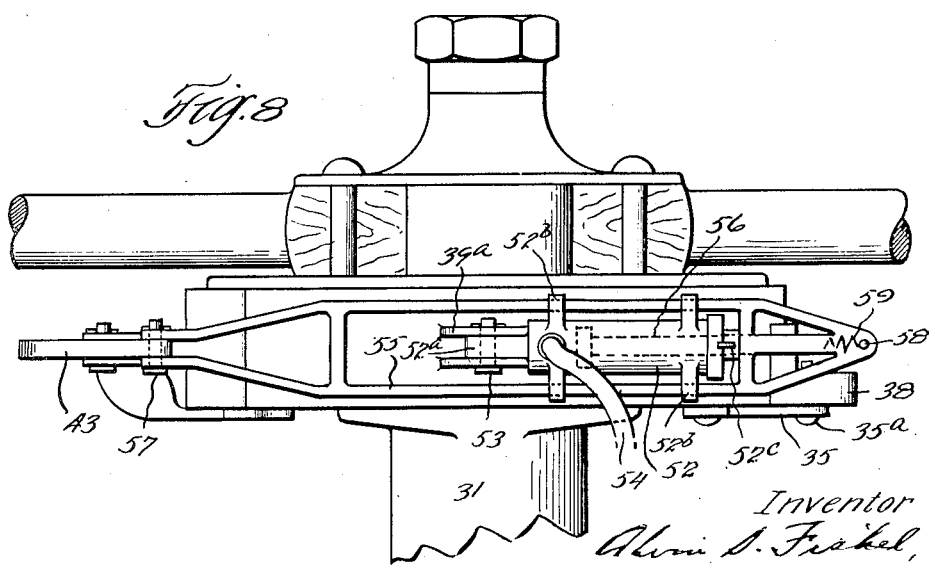

Patented July 31, 1928.

1,678,696

UNITED STATES PATENT OFFICE.

ALVIN S. FISHEL, OF CLEVELAND, OHIO.

BRAKE SUPPORTING AND OPERATING MECHANISM.

Application filed December 5, 1923. Serial No. 678,664.

This invention relates to brakes for automobiles, or similar vehicles, which are adapted to be operated by fluid under pressure, the operating fluid which I prefer at present for this purpose being oil or similar liquid. The invention is adapted for and capable of use with the steering wheels, as well as with the driving, or non-steering, wheels of such vehicles.

It is the general purpose and object of my invention to provide means for mounting the brake-operating cylinders in a particularly efficient manner; also to provide means for supporting the brakes, and for operating the same from such cylinders, in a like efficient manner. Further and more limited objects of the invention will appear in the specification and will be realized in and through the combinations of elements embodied in the claims.

Figure 1:
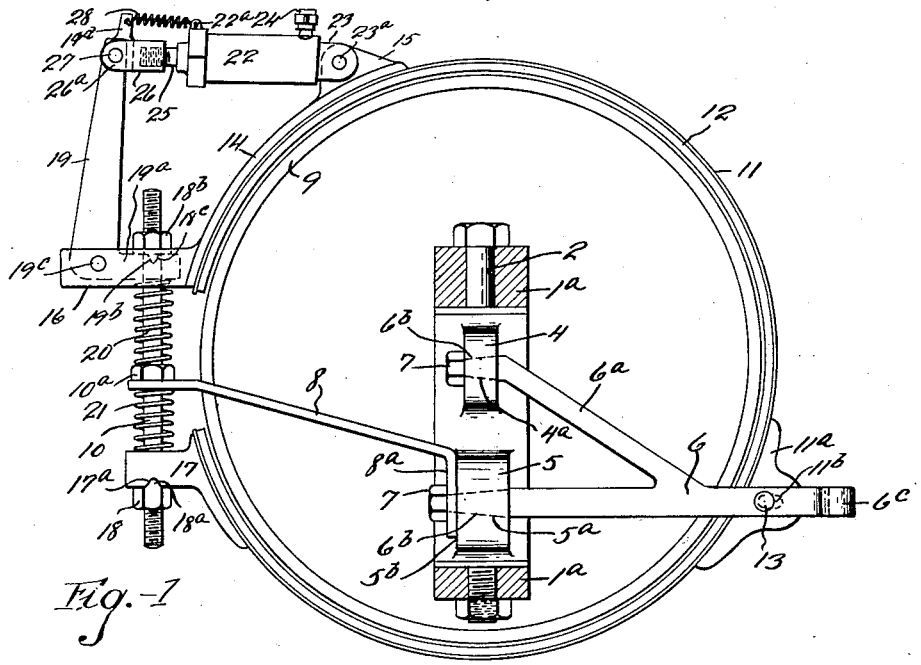
Figure 2:
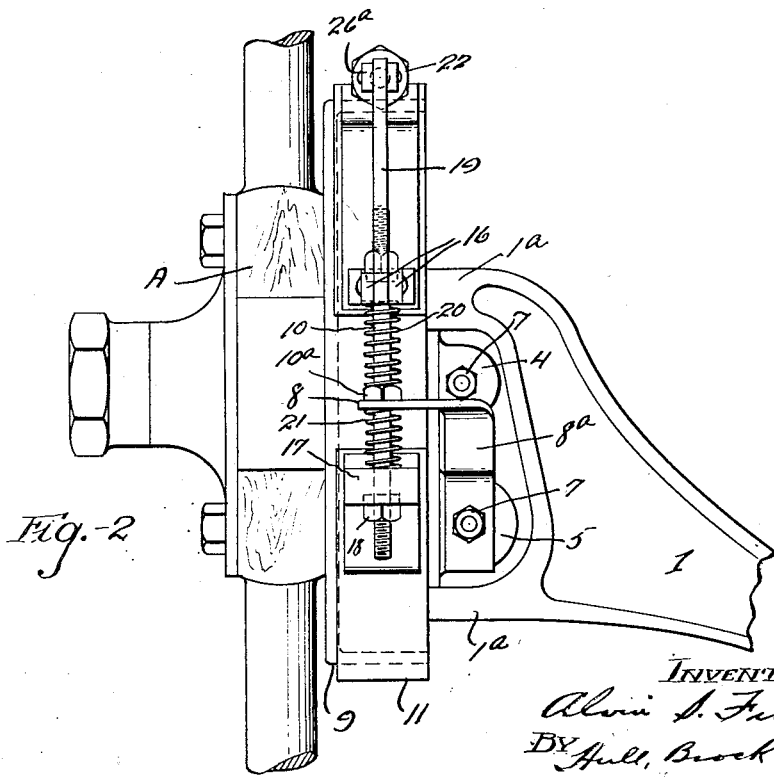

In the drawings forming part hereof, Fig. 1 represents a sectional side elevation of a brake drum as applied to the front, or steering, wheel of an automobile, together with the brake and the associated parts for supporting and operating the same; Fig. 2, a view taken at right angles to Fig. 1, a portion of the wheel hub A being shown in section; Fig. 3 is a view, similar to Fig. 1, showing my invention applied to a rear or driving wheel; Fig. 4 a plan view of the parts shown in Fig. 3, the hub being shown in section; Figs. 5 and 6 are views, similar to Figs. 3 and 4, respectively, showing a modification of the invention; and Figs. 7 and 8 are views, also similar to Figs. 3 and 4, respectively, showing a further modification of the invention.

Describing the various parts by reference characters, and with particular reference to Figs. 1 and 2, 1 denotes the front or steering axle of an automobile having the forks $1^a$ adapted to receive the king-pin 2, by means of which it is pivoted to the steering knuckle 3, the knuckle being shown in elevation in Fig. 1. The steering knuckle is provided with a pair of bosses 4, 5, each having a tapered aperture $4^a$, $5^a$, therethrough, respectively, the apertures being adapted to receive correspondingly tapered portions $6^b$ on the steering knuckle arm 6 and the diagonal brace $6^a$ thereof. The ends of the parts $6^b$ are threaded for the reception of nuts 7, by means of which the tapered parts are drawn to their seats. The lower lug 5 is of such extent as to provide an extended bearing surface at $5^b$ for the angularly deflected end $8^a$ of the brake-band supporting arm 8, the arm being secured to the lug by means of the nut 7. The outer end of the arm 8 extends beyond the brake drum 9 and is provided with an aperture for the passage of the adjusting bolt 10.

11 denotes a brake of the external brake-band type extending nearly around the drum 9 and provided with the lining 12. This brake band is provided with a bracket $11^a$ attached thereto, which bracket is supported by an anchor pin 13 mounted in the arm 6 and extending through a slot $11^b$ in such bracket. The inner end of the arm 6 is provided with an eye $6^c$ to which the tie rod (not shown) may be connected. The upper end portion of the brake band is provided with a saddle 14, from the upper end of which there projects a lug 15 and from the lower end of which projects the forked bracket 16. Projecting from and secured to the upper end of the lower portion of the brake-band is the bracket 17, the last mentioned bracket having an aperture therethrough for the passage of the lower end of the bolt 10 and having the usual seats $17^a$ for the knife-blade bearing $18^a$ on the adjusting nut 18. The upper end of the bolt is provided with a nut $18^b$ also having knife-blade bearings $18^c$ adapted to engage corresponding seats $19^b$ on the horizontal arm $19^a$ of a bell crank lever, the upper vertical arm of which is shown at 19. This bell-crank lever is pivoted between the forks of the bracket 16, as indicated at $19^c$. The bolt 10 is provided with the usual springs 20 and 21, located above and below the outer end of the arm 8, respectively, the first mentioned spring bearing at its upper end against the arm $19^a$ and at its lower end against the equalizing and adjusting nut $10^a$ which is threaded on bolt 10, while the spring 21 bears at its upper end against the end of the arm 18 and at its lower end against the bracket 17.

22 denotes a cylinder having a clevis 23 at one end by means of which it is pivoted to the lug 15, as indicated at $23^a$. This cylinder is provided with a supply pipe or hose 24 for oil or other fluid under pressure. The piston (not shown) is provided with a piston rod 25 which is adjustably connected to the upper portion of the lever arm 19 by means of the yoke 26, the yoke being provided with a clevis 26ª by means of which and a pin 27 a pivotal connection with the upper end of the lever arm 19 is effected. The arm 19 is provided with an extension 19ᵈ to which one end of a helical spring 28 is connected, the other end of the spring being connected to a lug 22ª on the adjacent end of the cylinder 22.

With the parts constructed and arranged as described, it will be evident that, when oil or other fluid under pressure is admitted to the cylinder 22 it will move the piston rod 25 toward the left, thereby rocking the brake band lever about its pivot 19ᶜ, lifting the adjusting bolt 10 in the usual manner until the lower part of the brake is in engagement with the drum. Further movement of the arm 19 to the left will result in exerting a downward thrust upon the pivot 19ᶜ, thus applying the upper section of the brake to the drum. A still further application of pressure fluid to the cylinder will result in clamping both sections of the brake more firmly to the drum. Upon relieving the pressure in the supply pipe or hose 24, the springs 20 and 21 will free the brake from the drum in the usual manner. The manner in which I prefer supplying oil or similar fluid under pressure to the cylinder and relieving the pressure of the fluid in such cylinder when it is desired to release the brakes is preferably that constituting the subject matter of my co-pending application Serial No. 678,668, filed December 5, 1923.

In this embodiment of my invention, which is particularly well adapted for use with brakes for front or steering wheels, the brake is supported intermediate its ends from the steering knuckle arm and the operating cylinder is pivotally supported from the brake band, adjacent to one end thereof. By the construction of the steering knuckle arm and the manner of connecting it to the steering knuckle, the arm is not only strengthened by the upper diagonal brace 6ª, but is secured firmly to the knuckle; and it is enabled to provide an efficient support for the brake band and for the supporting arm 8.

In Figs. 3 and 4 of the drawing there is shown a modification of my invention, which embodies some of the features shown in Figs. 1 and 2, showing the same applied to a non-steering wheel.

In these views 29 denotes a wheel-driving shaft, 30 the housing and 31 a sleeve mounted on said housing and which may carry the spring seat, and which has projecting therefrom the arms 32 supporting a circular plate 33 which substantially closes the open end of the brake drum 34. Projecting from and secured to the plate 33 is an arm 35, which arm supports the brake band 36 and lining 37 by means of a pin 35ª mounted in said arm and in the slot 38ª of a bracket 38 secured to the brake band about equidistant from the ends thereof.

The brake band has attached thereto a bracket 39 having a pair of lugs 39ª to which one end of the cylinder 40 is pivoted by means of a lug 40ª and a pin 39ᵇ, the said cylinder having the fluid pressure supply pipe or hose 40ᵇ. 41 denotes the piston and 41ª the piston rod, the outer end of the said rod being provided with a clevis 41ᵇ pivoted by a pin 42 to the upper end of one arm 43 of an angle or bell crank lever, the other arm 43ª of which is pivotally connected by a pin 44 to a lug 45 carried by one end of the brake band. A spring 46 is interposed between the end of the cylinder 40 and the end of the clevis 41ᵇ and tends to keep the piston in brake-releasing position.

The arm 43ª of the angle lever is pivotally connected intermediate of its ends by a pin 46 with a yoke or clevis 47ª at the upper end of the adjusting bolt 47. This bolt extends through an aperture in the outer end of an arm 48 which is secured to the plate 33 and through an aperture on the bracket 49 which is secured to the lower end of the brake band. The lower end of the bolt 47 is provided with a nut 47ᵇ similar to the nut 18 and mounted upon the bracket 49 in the same manner as such nut. Above the arm 48, the bolt is provided with the equalizing and adjusting nuts 47ᶜ which normally engage the arm 48; and between said arm and the bottom of the clevis 47ª there is interposed a spring 50 which tends to hold the arm 43ª in elevated position.

In the operation of the form of my invention shown in the views just discussed, fluid under pressure is admitted through the supply pipe or hose 40ᵇ, which forces the piston 41 to the right, moving the arm 43ª upward about the pin 44 as a pivot and setting the lower portion of the brake band against the drum. When the lower portion of the band has engaged the drum, upward movement of the arm 43ª and of the pin 46 will cease, and the arm will rock about the pin 46 as a pivot, forcing downwardly the pin 44 and the upper portion of the brake band attached thereto until the upper section of the brake band is in engagement with the drum. Further application of pressure to the cylinder 40 will cause the upper and lower parts of the brake band to engage the drum all the more firmly.

By the construction shown and described in Figs. 3 and 4, I am enabled to apply my fluid-pressure operating system to brakes and brake drums with comparatively slight alterations in the standard construction of such brakes and drums; and to secure thereby a most efficient means for operating the brakes and for supporting the brake-operating mechanism.

In Figs. 5 and 6, there is shown a still further modification of my invention, which is substantially identical with that shown in Figs. 3 and 4, the only difference being that the cylinder 40 is pivotally supported by trunnion pins 40ᶜ in a saddle 51ᵃ carried by a bracket 50, instead of being pivoted at one end by a lug 40ᵃ interposed between lugs 39ᵃ of the bracket 39. Because of this location of the cylinder, the upper arm 43 of the angular brake band lever is inclined further toward the brake assembly than is the case with the like-designated arm on Fig. 3. The other parts shown in Figs. 5 and 6, being identical with those shown in Figs. 3 and 4, are designated by the same numerals as employed with the former figures.

In Figs. 7 and 8 there is shown a still further modification of my invention which, except as to the special manner of mounting and supporting the cylinder, is identical with the forms of my invention shown in Figs. 3–6 inclusive; and, because of such identity, all of the parts shown in Figs. 7 and 8 are designated with the same numerals as are employed on Figs. 3–6, with the exception of the cylinder, the support therefor, and the connection between the piston rod and the angular brake-band lever. The bracket to which one end of the cylinder is pivoted is shown as identical with that in Figs. 3 and 4 and is designated by like numerals, 39 denoting the body of the bracket and 39ᵃ the lugs between the upper ends of which the cylinder 52 is pivoted by means of the lug 52ᵃ and the pin 53. The cylinder is provided with a supply connection having the pipe or hose 54 connected thereto for admitting oil or other fluid under pressure. It is also provided with a pair of eyes 52ᵇ on each side thereof forming guides for the side members or rods 55 of a connecting frame, one end of which is connected to the piston rod 56 and the other end of which is connected by a pin 57 with the upper end of the arm 43. The end of the frame to which the piston rod is connected is provided with a cross pin 58 to the opposite ends of which helical springs 59 are attached, the other ends of said springs being connected to lugs 52ᶜ on the ends of the cylinder.

Having thus described my invention, what I claim is:—

1. The combination, with a brake drum and a brake band arranged to cooperate therewith, the said band having brackets at opposed ends thereof, of an angular brake band lever pivoted to one of said brackets, a bolt connected with said lever and extending through the said brackets, an anchored arm having a portion intermediate said brackets through which said bolt extends, a spring interposed between the said arm and the said lever, a fluid pressure cylinder pivotally mounted on said brake band, a piston rod extending from said cylinder, and an operative connection between the brake band lever and the said piston rod.

2. The combination, with a brake drum and a brake band arranged to cooperate therewith, the said band having upper and lower brackets, of an angular brake band lever pivoted to the upper bracket, a bolt extending through the upper and lower brackets, an anchored arm having a portion intermediate said brackets through which said bolt extends, a spring interposed between each of the said brackets and said anchored arm, a fluid pressure cylinder pivotally mounted on said brake band above the upper end thereof, a piston rod extending from said cylinder, and an operative connection between the upper end of the brake band lever and the said piston rod.

3. The combination, with a brake drum and a brake band arranged to cooperate therewith, the said band having brackets at opposed ends thereof, of an angular brake band lever pivoted to one of said brackets, a bolt connected with said lever and extending through the other bracket, an anchored arm having a portion intermediate said brackets through which said bolt extends, a spring interposed between each of said brackets and said anchored arm, a fluid pressure cylinder pivotally mounted on said brake band adjacent the bracket carrying said angular lever, a piston rod extending from said cylinder, and an operative connection between the brake band lever and the said piston rod.

4. The combination, with a brake drum, of a brake band cooperating therewith and having upper and lower brackets, an angular brake band lever pivotally connected to the upper bracket, a lug on said brake band above the upper bracket, a cylinder pivotally mounted on said lug, a piston rod extending from said cylinder, means for supplying pressure fluid to said cylinder, a connection between the said piston rod and the said lever, and connections between the said lever and the said brackets for applying the brake to the drum through the movement of said lever by said piston rod.

5. The combination, with a brake drum, of a brake band cooperating therewith and having brackets at opposed ends thereof, an angular brake band lever pivotally connected to one of said brackets, a lug on said brake band, a cylinder pivotally mounted on said lug, a piston rod extending from said cylinder, means for supplying pressure fluid to said cylinder, a connection between said piston rod and the said lever, connections between the said lever and the said brackets for applying the brake to the drum through the movement of said lever by said piston rod, an arm extending from a fixed support to a point between said brackets, and means movably supporting such portion of the brake band from said arm.

6. The combination, with a brake drum and a brake band arranged in operative relation thereto, of a fluid pressure cylinder pivotally mounted on said brake band and having a piston rod extending therefrom, means including an angular brake band lever for applying the said brake band to the said drum, said brake band lever being pivoted to said brake band at a point adjacent said cylinder, means pivotally connecting the piston rod and the said lever for operating the latter, and a spring connected with the said lever and with the cylinder for moving the lever in a brake-releasing direction when the operating pressure upon the fluid is removed.

7. The combination, with a steering knuckle having a pair of spaced lugs projecting therefrom and provided each with a tapered aperture, of a steering knuckle arm having forks provided each with a tapered end adapted to be received in said apertures and nuts threaded on such ends, a brake-band supporting arm secured to one of said lugs, a brake drum, a brake band arranged in operative relation to said drum, means movably connecting said brake band to the said steering knuckle arm, a bracket at each end of said band, an angular brake band lever pivoted to one of said brackets, an adjusting bolt operatively connected with the other bracket and with one of the arms of said lever and extending through the second-mentioned arm, and means connected with said lever for operating the same about its pivot.

8. The combination, with a steering knuckle having a pair of spaced lugs projecting therefrom, of a steering knuckle arm having forks secured to said lugs, a brake band supporting arm secured to said knuckle, a brake drum, a brake band arranged in operative relation to said drum, means movably connecting said brake band to the said steering knuckle arm, a bracket at each end of said band, an angular brake band lever pivoted to one of said brackets, an adjusting bolt operatively connected with the other bracket and with one of the arms of said lever and extending through the second-mentioned arm, and means connected with said lever for operating the same about its pivot.

9. The combination, with a steering knuckle, of a steering knuckle arm connected thereto at spaced points, a brake drum, a brake band mounted in operative relation to said drum and having a portion movably connected with said arm, a fluid pressure cylinder pivotally mounted on said band, a piston rod extending from said cylinder, and an operative connection between said rod and said brake band for applying the same to said drum.

10. The combination, with a steering knuckle, of a reach rod steering arm connected thereto, a brake drum, a brake band mounted in operative relation to said drum and having a portion movably connected with said reach rod steering arm, a fluid pressure cylinder pivotally mounted on the braking mechanism, a piston rod extending from said cylinder, and an operative connection between said rod and said brake band for applying the same to said drum.

11. The combination, with a steering knuckle, of a steering knuckle arm having a forked end connected to said knuckle, an arm also connected to said knuckle and extending in the opposite direction from the first mentioned arm, a brake drum, a brake band arranged in operative relation to said drum and having its ends arranged on opposite sides of the end of the second arm, means movably connecting the said brake band with the steering knuckle arm, a cylinder pivotally mounted on the brake band, a piston rod extending from said cylinder, an angular brake band lever pivotally supported from one end of the brake band and connected to said piston rod, and an adjusting bolt connected with said arm and with the opposite end of the brake band and extending through the second arm.

12. The combination, with a brake drum, of a brake band arranged in operative relation thereto, an arm extending between the ends of the brake band, an arm extending in the opposite direction and movably connected to said brake band, a fluid pressure cylinder pivotally mounted on the said brake band, a piston in said cylinder, an angular brake band lever connected at one end to said piston rod and pivotally connected to one end of the brake band, an adjusting bolt connecting the said lever and the other end of the brake band and extending through the first mentioned arm, and a spring connected with the piston rod for returning the same to brake-releasing position after operation by the pressure fluid.

13. The combination, with a steering knuckle, of a steering knuckle arm connected to said knuckle, an arm also connected to said knuckle and extending in the opposite direction from the first-mentioned arm, a brake drum, a brake band arranged in operative relation to said drum and having its ends arranged on opposite sides of the end of the second arm, means movably connecting the said brake band with the steering knuckle arm, a cylinder pivotally mounted on the brake band, a piston rod extending from said cylinder, an angular brake band lever pivotally supported from one end of the brake band and connected to said piston, and an adjusting bolt connected with said arm and with the opposite end of the brake band and extending through the second arm.

14. The combination, with a steering knuckle having a lug thereon, of a brake drum and a brake band arranged in operative relation thereto, a steering knuckle arm having an end extending through said lug, an arm extending between the ends of said brake band and having its opposite end bearing against said lug and having an aperture for the end of the first arm, a nut securing the lug-engaging ends of said arms to such lug, a fluid pressure cylinder pivotally mounted on the said brake band, a piston rod extending from said cylinder, an angular brake band lever connected at one end to said piston rod and pivotally connected to one end of the brake band, an adjusting bolt connecting the said lever and the other end of the brake band and extending through the second mentioned arm, and a spring connected with the piston rod for returning the same to brake-releasing position after operation by the pressure fluid.

15. The combination, with a brake drum, of a brake band cooperating therewith, a lever pivotally supported intermediate of its ends and operatively connected with the ends of said band, a cylinder pivotally mounted on said brake band, means for supplying pressure fluid to said cylinder, and an operative connection between the said cylinder and the said lever.

16. The combination, with a brake drum, of a brake band cooperating therewith and having brackets adjacent each end, a lever pivotally supported intermediate of its ends on one of said brackets, an operative connection between said lever and the other of said brackets, a cylinder pivotally mounted on said brake band adjacent the pivotal support of said lever, a piston rod extending from said cylinder, means for supplying pressure fluid to said cylinder, and a connection between the said piston rod and the said lever.

In testimony whereof, I hereunto affix my signature.

ALVIN S. FISHEL.